US011755620B1

(12) United States Patent
Jain et al.

(10) Patent No.: US 11,755,620 B1
(45) Date of Patent: Sep. 12, 2023

(54) INVOKING SUPPORTED NON-RELATIONAL DATABASE OPERATIONS TO PROVIDE RESULTS CONSISTENT WITH COMMANDS SPECIFIED IN A RELATIONAL QUERY LANGUAGE

(71) Applicant: Amazon Technologies, Inc., Seattle, WA (US)

(72) Inventors: Vaibhav Jain, Seattle, WA (US); Rishabh Jain, Seattle, WA (US); Amit Gupta, Redmond, WA (US); Palak Agrawal, Seattle, WA (US); Sagar Mundra, Seattle, WA (US); Benjamin Donald Wood, Seattle, WA (US); Lewis Bruck, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 322 days.

(21) Appl. No.: 16/844,888

(22) Filed: Apr. 9, 2020

(51) Int. Cl.
*G06F 16/2453* (2019.01)
*G06F 16/28* (2019.01)
*G06F 16/242* (2019.01)

(52) U.S. Cl.
CPC .......... *G06F 16/28* (2019.01); *G06F 16/2445* (2019.01); *G06F 16/2453* (2019.01)

(58) Field of Classification Search
CPC ............. G06F 16/2445; G06F 16/2453; G06F 16/24534; G06F 16/24553; G06F 16/24557; G06F 16/28; G06F 16/3331; G06F 16/3332
See application file for complete search history.

(56) References Cited

U.S. PATENT DOCUMENTS

| | | | |
|---|---|---|---|
| 9,886,483 B1 | 2/2018 | Harrison et al. | |
| 10,922,357 B1* | 2/2021 | Chennuru | G06F 16/2457 |
| 2001/0004737 A1* | 6/2001 | Laux | G06F 16/256 |
| 2012/0330954 A1* | 12/2012 | Sivasubramanian | G06F 16/20 |
| | | | 707/E17.089 |
| 2014/0337393 A1* | 11/2014 | Burchall | G06F 16/2336 |
| | | | 707/826 |
| 2016/0352867 A1* | 12/2016 | Subbarayan | H04L 69/329 |
| 2018/0218044 A1 | 8/2018 | Wong et al. | |
| 2019/0004927 A1* | 1/2019 | Yang | G06F 16/2452 |
| 2019/0196796 A1* | 6/2019 | Bahrami | G06F 8/38 |
| 2019/0196890 A1* | 6/2019 | Bucchi | G06F 16/951 |
| 2019/0384764 A1 | 12/2019 | Taylor | |
| 2020/0110843 A1* | 4/2020 | Dunjic | G06F 16/334 |

FOREIGN PATENT DOCUMENTS

CN 110162408 A * 8/2019

\* cited by examiner

*Primary Examiner* — James E Richardson
(74) *Attorney, Agent, or Firm* — S. Scott Foster; Kowert, Hood, Munyon, Rankin & Goetzel, P.C.

(57) ABSTRACT

Non-relational database operations are invoked to provide results consistent with commands specified in a relational query language. A request to access data in a non-relational database is received that includes one or more commands specified in a query language for accessing data according to a relational data scheme. The request may be evaluated to determine one or more Application Programming Interfaces (APIs) to invoke operations at the non-relational database that provide a result consistent with the commands specified in the query language. The determined APIs are executed and a result returned for the request based on the execution of the APIs.

20 Claims, 10 Drawing Sheets

INVOKING SUPPORTED NON-RELATIONAL DATABASE OPERATIONS TO PROVIDE RESULTS CONSISTENT WITH COMMANDS SPECIFIED IN A RELATIONAL QUERY LANGUAGE

BACKGROUND

Non-relational databases offer flexible, high-performance storage solutions for data utilized by many different types of applications. Because data in non-relational databases can be stored without adhering to a pre-defined data schema, data can be easily maintained in a non-relational database for applications where the information collected for different objects is variable (e.g., a user record that has multiple profiles or a user record that has only one profile). However, access to non-relational database systems typically utilizes proprietary protocols or languages that invoke system-specific Application Programming Interfaces (APIs), which may have startup costs for developers to become adept at using the non-relational database. Techniques, therefore, that expand the accessibility of non-relational databases are highly desirable.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The techniques described herein may implement invoking supported non-relational database operations to provide results consistent with commands specified in a relational query language, according to some embodiments. Query languages have provided database developers with a consistent and platform independent technique for accessing data. These query languages are often specified for accessing relational data that adheres to a predefined data model, such as Structured Query Language (SQL). However, many of the types of operations invoked by such query languages are more widely applicable than to just relational databases. SQL and SQL-like languages or extensions to SQL (e.g., PartiQL) are offering developers with the capability to use SQL-like syntax to access database data by utilizing similar query language syntax that expresses access requests in a relational manner when the underlying database data is not actually stored in a relational schema. In various embodiments, techniques for translating the query languages to invoke determined operations for a non-relational database may expand the number of applications available to interact with the non-relational database, as well as the developers able to utilize a non-relational database. Moreover, may non-relational database operations are highly performant when compared with similar operations performed by a relational database, and therefore providing access to client applications using SQL or SQL-like syntaxes can improve the performance of the client application by leveraging the better performance of non-relational databases.

Figure 1:
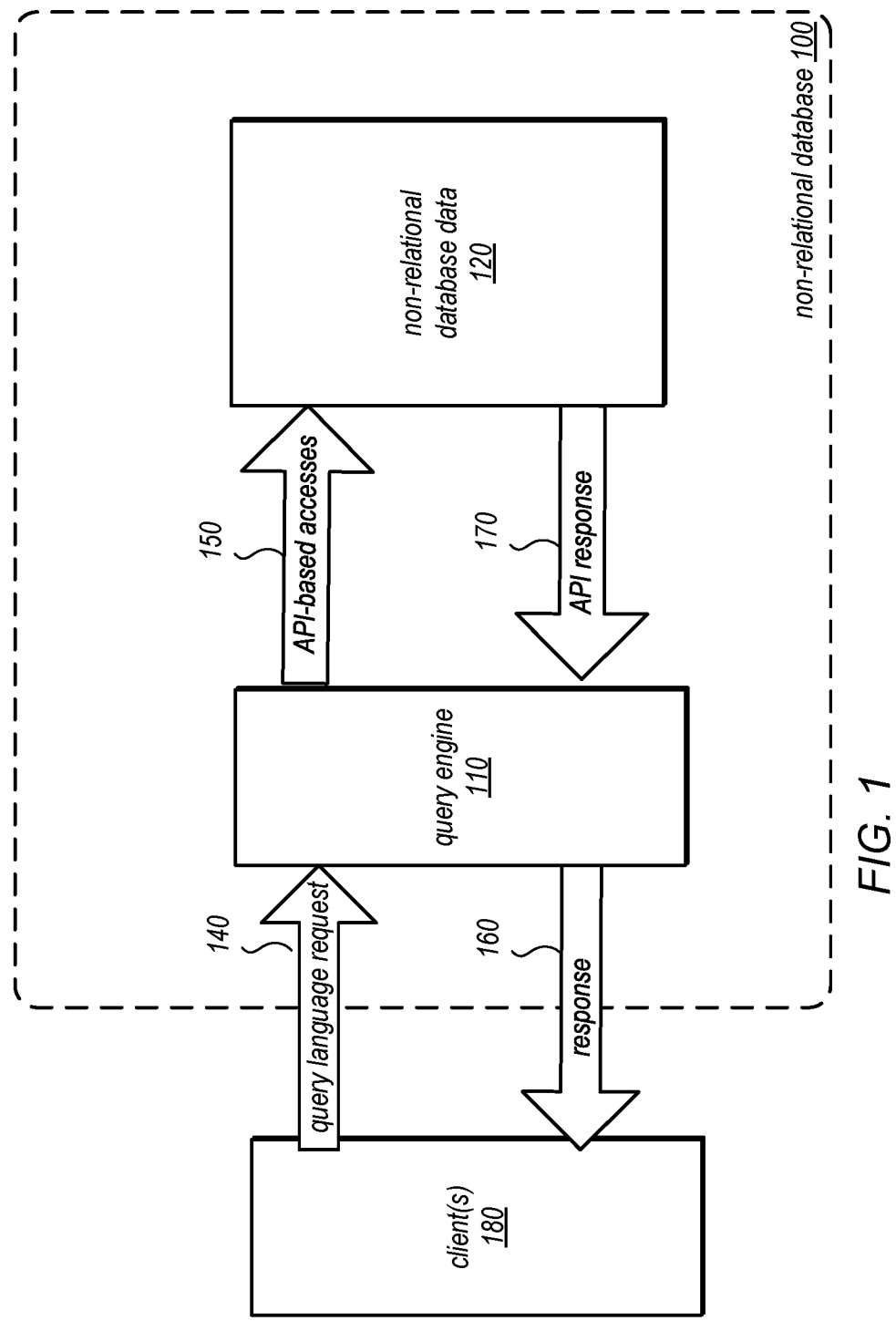
FIG. 1 is a logical block diagram illustrating invoking supported non-relational database operations to provide results consistent with commands specified in a relational query language, according to some embodiments.

FIG. 1 is a logical block diagram illustrating invoking supported non-relational database operations to provide results consistent with commands specified in a relational query language, according to some embodiments. Non-relational database 100 may be a network-based service (e.g., as discussed below with regard to FIG. 2) or a standalone server or application that stores and provides access to data in a non-relational manner. Various types of non-relational databases 100, storing various types of data may be implemented in different embodiments (e.g., NoSQL databases, document databases, key-value data stores, semi-structure or unstructured data stores, etc.). Access to non-relational database data 120 may be provided by different types of Application Programming Interface (APIs). For example, an API may be invoked to retrieve an item, or update the item, or add a new item.

Non-relational database 100 may implement query engine 110 to handle requests to access non-relational database data from clients 180. Clients 180 may be another application, system, or device that generates requests, such as query language request 140. Query engine 110 can perform or manage the performance of various requests, including API requests (not illustrated) and query language requests, as discussed according to the techniques below with regard to FIGS. 3, 8 and 9. For example, when a query language request 140 is received, query engine 110 may determine or select one or more API requests that can provide a result consistent with the query language request, perform API-based accesses 150 to non-relational database data 120, and based on the API response 170, return a result as part of response 160. In this way, client(s) 180 can perform requests in either a query language format or an API.

Please note that previous descriptions of implementing invoking supported non-relational database operations to provide results consistent with commands specified in a relational query language, but are merely provided as logical examples.

This specification begins with a general description of a provider network that may implement a non-relational database service that may implement invoking supported non-relational database operations to provide results consistent with commands specified in a relational query language. Then various examples of a non-relational database service are discussed, including different components/modules, or arrangements of components/module, that may be employed as part of implementing the database service, in one embodiment. A number of different methods and techniques to implement invoking supported non-relational database operations to provide results consistent with commands specified in a relational query language are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
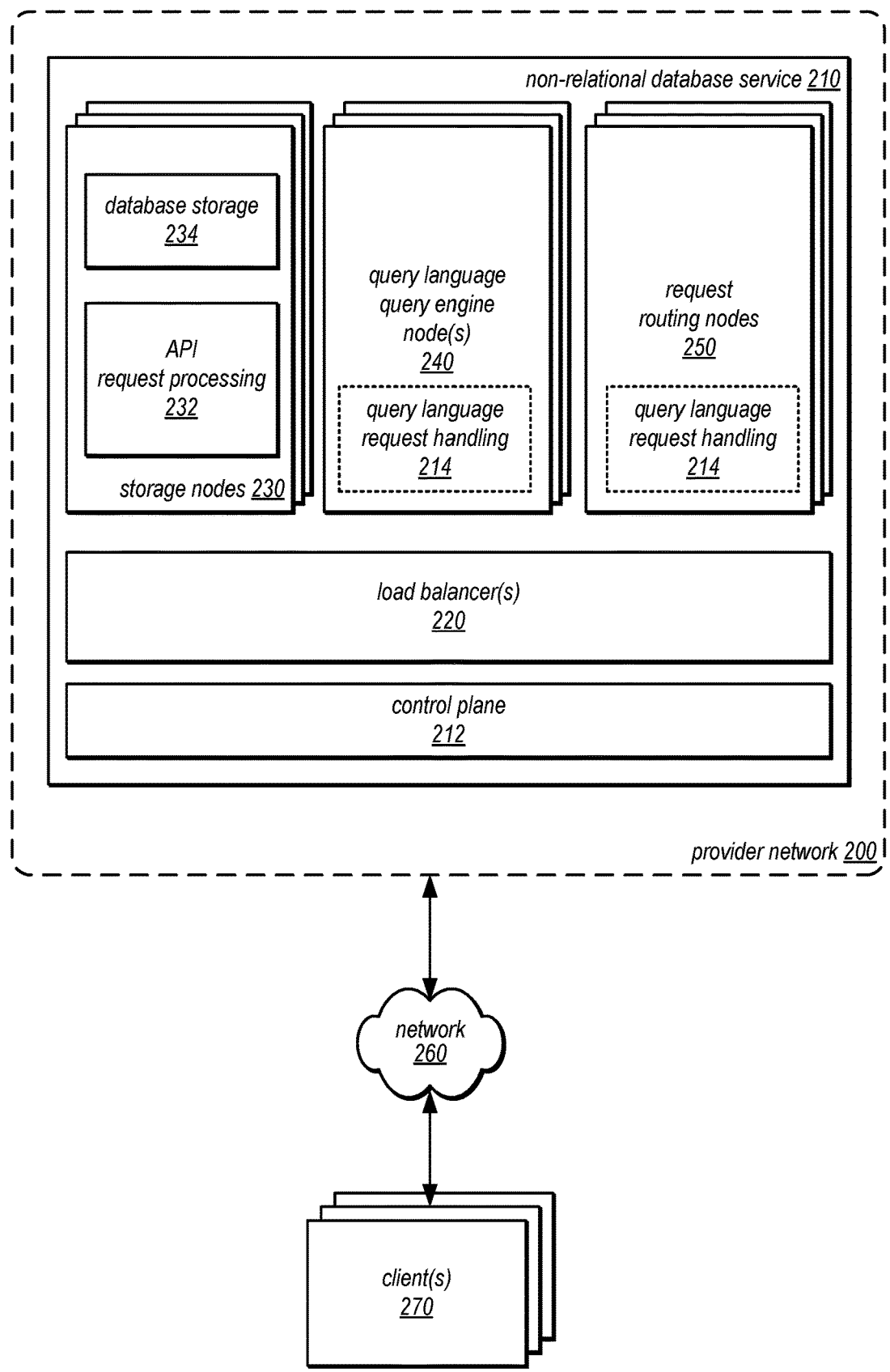
FIG. 2 is a logical block diagram illustrating a provider network that implements a database service that may implement invoking supported non-relational database operations to provide results consistent with commands specified in a relational query language, according to some embodiments.

FIG. 2 is a logical block diagram illustrating a provider network that implements a database service that may implement invoking supported non-relational database operations to provide results consistent with commands specified in a relational query language, according to some embodiments. Provider network 200 may be a private or closed system, in one embodiment, or may be set up by an entity such as a company or a public sector organization to provide one or more services (such as various types of cloud-based storage) accessible via the Internet and/or other networks to clients 270, in another embodiment. In one embodiment, provider network 200 may be implemented in a single location or may include numerous data centers hosting various resource pools, such as collections of physical and/or virtualized computer servers, storage devices, networking equipment and the like (e.g., computing system 1000 described below with regard to FIG. 10), needed to implement and distribute the infrastructure and storage services offered by the provider network 200. In one embodiment, provider network 200 may implement various computing resources or services, such as non-database service(s) 210 (e.g., NoSQL databases, document databases, key-value stores, or other database services that do not require a pre-defined data model or structure (e.g. a relational structure) to be imposed upon data stored to perform queries or other access requests to the data), and other services (not illustrated), such as a map reduce service, data warehouse service, data flow processing service, and/or other large scale data processing techniques), data storage services (e.g., an object storage service, block-based storage service, or data storage service that may store different types of data for centralized access), virtual compute services, and/or any other type of network-based services (which may include various other types of storage, processing, analysis, communication, event handling, visualization, and security services).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 10 and described below. In one embodiment, the functionality of a given system or service component (e.g., a component of non-relational database service 210) may be implemented by a particular node or may be distributed across several nodes. In some embodiments, a given node may implement the functionality of more than one service system component (e.g., more than one data store component).

Non-relational database service 210 may include various types of non-relational database services, in one embodiment, for storing, querying, and updating data. Such services may be enterprise-class database systems that are highly scalable and extensible. In one embodiment, queries may be directed to a database in non-relational database service 210 that is distributed across multiple physical resources, and the database system may be scaled up or down on an as needed basis. The database system may work effectively with database schemas of various types and/or organizations, in different embodiments. In one embodiment, non-relational database service 210 may provide a RESTful programmatic interface in order to submit access requests (e.g., to get, insert, delete, or query data).

In one embodiment, clients 270 may encompass any type of client configurable to submit network-based requests to provider network 200 via network 260, including requests for non-relational database service 210 (e.g., to perform a transaction to a database hosted in non-relational database service 210). For example, in one embodiment a given client 270 may include a suitable version of a web browser, or may include a plug-in module or other type of code module that executes as an extension to or within an execution environment provided by a web browser. Alternatively in a different embodiment, a client 270 may encompass an application such as a database client/application (or user interface thereof), a media application, an office application or any other application that may make use of a database in non-relational database service 210 to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with provider network 200, in one embodiment. In one embodiment, client 270 may generate network-based services requests according to a Representational State Transfer (REST)-style network-based services architecture, a document- or message-based network-based services architecture, or another suitable network-based services architecture. Note that in some embodiments, clients of database service(s) 210 may be implemented within provider network 200 (e.g., applications hosted on a virtual compute service).

In one embodiment, a client 270 may provide access to provider network 200 to other applications in a manner that is transparent to those applications. For example, client 270 may integrate with a database on non-relational database service 210. In such an embodiment, applications may not need to be modified to make use of the storage system service model. Instead, the details of interfacing to the non-relational database service 210 may be coordinated by client 270.

Client(s) 270 may convey network-based services requests to and receive responses from provider network 200 via network 260, in one embodiment. In one embodiment, network 260 may encompass any suitable combination of networking hardware and protocols necessary to establish network-based-based communications between clients 270 and provider network 200. For example, network 260 may encompass the various telecommunications networks and service providers that collectively implement the Internet. In one embodiment, network 260 may also include private networks such as local area networks (LANs) or wide area networks (WANs) as well as public or private wireless networks. For example, both a given client 270 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 270 and the Internet as well as between the Internet and provider network 200. It is noted that in one embodiment, client(s) 270 may communicate with provider network 200 using a private network rather than the public Internet.

Non-relational database service 210 may implement request routing nodes 250, in one embodiment. Request routing nodes 250 may receive, authenticate, parse, throttle and/or dispatch service or other access requests, among other things, in one embodiment. For example, FIGS. 4-7, discuss various embodiments of implementing request routing nodes 250 to dispatch different types of requests. In one embodiment, request routing nodes 250 may support handling requests formatted according to an interface to support different types of web services requests. For example, in one embodiments, non-relational database service 210 may implement a particular web services application programming interface (API) that supports a variety of operations on tables (or other collections of data objects) that are maintained and managed on behalf of clients/users by the non-relational database service (and/or data stored in those tables/collections). In one embodiment, non-relational database service 210 may support different types of services requests. For example, in one embodiments, database service 210 may implement a particular web services application programming interface (API) that supports a variety of operations on tables (or other data objects) that are maintained and managed on behalf of clients/users by the data storage service system (and/or data stored in those tables), such as a request to perform a transaction that includes operations (e.g., requests to read, write, update, delete, add, or insert items in a table) with respect to one or multiple items across one or multiple partitions of a table hosted at one or multiple storage nodes. Similarly, a request may be a request to perform operations on individual items (e.g., requests to read, write, update, delete, add, or insert items in a table, according to a specified consistency level or characteristic). In one embodiment, request routing nodes 250 may perform parsing and/or throttling of service requests, authentication and/or metering of service requests, dispatching service requests, and/or maintaining partition assignments that map storage nodes to partitions of tables hosted in non-relational database service(s) 210.

In one embodiment, non-relational database service 210 may implement control plane 212 to implement one or more administrative components, such as automated admin instances which may provide a variety of visibility and/or control functions). Control plane 212 may provide visibility and control to system administrators, detect split events for partitions of tables at storage nodes, and/or anomaly control, resource allocation, in one embodiment. In one embodiment, control plane 212 may also include an admin console, through which system administrators may interact with database service 210 (and/or the underlying system). In one embodiment, the admin console may be the primary point of visibility and control for non-relational database service 210 (e.g., for configuration or reconfiguration of tables by system administrators). For example, the admin console may be implemented as a relatively thin client that provides display and control functionally to system administrators and/or other privileged users, and through which system status indicators, metadata, and/or operating parameters may be observed and/or updated. Control plane 212 may provide an interface or access to information stored about one or more detected control plane events, such as split requests to be processed, at non-relational database service 210, in one embodiment.

Control plane 212 may direct the performance of different types of control plane operations among the nodes, systems, or devices implementing database service 210, in one embodiment. For instance, control plane 212 may communicate with storage nodes to initiate the performance of various control plane operations, such as moves, splits, update tables, delete tables, create indexes, etc. . . . . . In one embodiment, control plane 212 may include a node recovery feature or component that handles failure events for storage nodes 230, query language query engine nodes 240, and request routing nodes 250 (e.g., adding new nodes, removing failing or underperforming nodes, deactivating or decommissioning underutilized nodes, etc).

In various embodiments, non-relational database service 210 may implement one or more load balancers 220 to direct requests to the appropriate components and distribute load. For example, load balancers may balance requests among request routing nodes (and/or query language query engine node(s) 240).

In one embodiment, non-relational database service 210 may also implement a plurality of storage nodes 230, each of which may manage one or more partitions of a database table (or other collection of data items) on behalf of clients/users or on behalf of non-relational database service 210 which may be stored in database storage 234 (on storage devices attached to storage nodes 230 or in network storage accessible to storage nodes 230).

In one embodiment, non-relational database service 210 may implement a separate fleet or service of query language query engine nodes, which may implement query language request handling 214, as discussed in detail below with regard to FIGS. 3-7.

Storage nodes 230 may implement API request processing 232, in one embodiment. API request processing 232 may create, update, define, query, and/or otherwise administer databases, in one embodiment. In one embodiment, API request processing 232 may handle requests to access the data (e.g., to perform transactions, to insert, modify, add, or delete data, and requests to query for data by generating query execution plans to determine which partitions of a database may need to be evaluated or searched in order to service the query). In one embodiment, API request processing 232 may also perform other management functions, such as enforcing access controls or permissions, concurrency control, or recovery operations.

In one embodiment, non-relational database service 210 may provide functionality for creating, accessing, and/or managing tables at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 2. Note also that in one embodiment, one or more storage nodes 230 process access requests on behalf of clients directed to tables. Some of these processing nodes may operate as if they were in a multi-tenant environment, and others may operate as if they were in a single-tenant environment. In some embodiments, storage nodes 230 that operate as in a multi-tenant environment may be implemented on different processing nodes (or on different virtual machines executing on a single host) than processing nodes that operate as in a single-tenant environment.

In addition to dividing or otherwise distributing data (e.g., database tables) across storage nodes 230 in separate partitions, storage nodes 230 may also be used in multiple different arrangements for providing resiliency and/or durability of data as part of larger collections or groups of resources. A replica group, for example, may be composed of a number of storage nodes maintaining a replica of a particular portion of data (e.g., a partition of a table) for the non-relational database service 210. Moreover, different replica groups may utilize overlapping nodes, where a storage node 230 may be a member of multiple replica groups, maintaining replicas for each of those groups whose other storage node 230 members differ from the other replica groups.

In some embodiments, non-relational database service 210 may implement a non-relational data model may include tables (or alternatively collections) containing items that have one or more attributes. In such embodiments, each table maintained on behalf of a client/user may include one or more items, and each item may include a collection of one or more attributes. The attributes of an item may be a collection of one or more key (or key)-value pairs, in any order, in some embodiments. In some embodiments, each attribute in an item may have a name, a type, and a value. In some embodiments, the items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 210 (and the underlying storage system) may have no pre-defined schema other than their reliance on the primary key, in some embodiments. Data in items may be nested, in some embodiments, such that an attribute that has a sub attribute which has a sub-sub attribute, etc.

Non-relational database service 210 may provide an application programming interface (API) for requesting various operations targeting tables, indexes, items, and/or attributes maintained on behalf of storage service clients. In some embodiments, the service (and/or the underlying system) may provide both control plane APIs and data plane APIs. The control plane APIs provided by non-relational database service 210 (and/or the underlying system) may be used to manipulate table-level entities, such as tables and indexes and/or to re-configure various tables These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or secondary indexes (e.g., to generate various performance reports or skew reports), modify table configurations or operating parameter for tables or secondary indexes (e.g., by modifying the amount of throughput capacity, adding storage capacity for additional read replicas, splitting partitions or moving partitions), and/or describe tables or secondary indexes. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by non-relational database service 210 (and/or the underlying system) may be used to perform item-level operations, such as transactions, storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation (JSON) or ION), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Non-relational database service 210 may include support for some or all of the following operations on data maintained in a table (or index) by the service on behalf of a storage service client: perform a transaction (inclusive of one or more operations on one or more items in one or more tables), put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, non-relational database service 210 (and/or underlying system) described herein may provide various data plane APIs for performing item-level operations, such as a TransactItems API, PutItem API, a GetItem (or GetItems) API, a DeleteItem API, and/or an UpdateItem API, as well as one or more index-based seek/traversal operations across multiple items in a table, such as a Query API and/or a Scan API.

Figure 3:
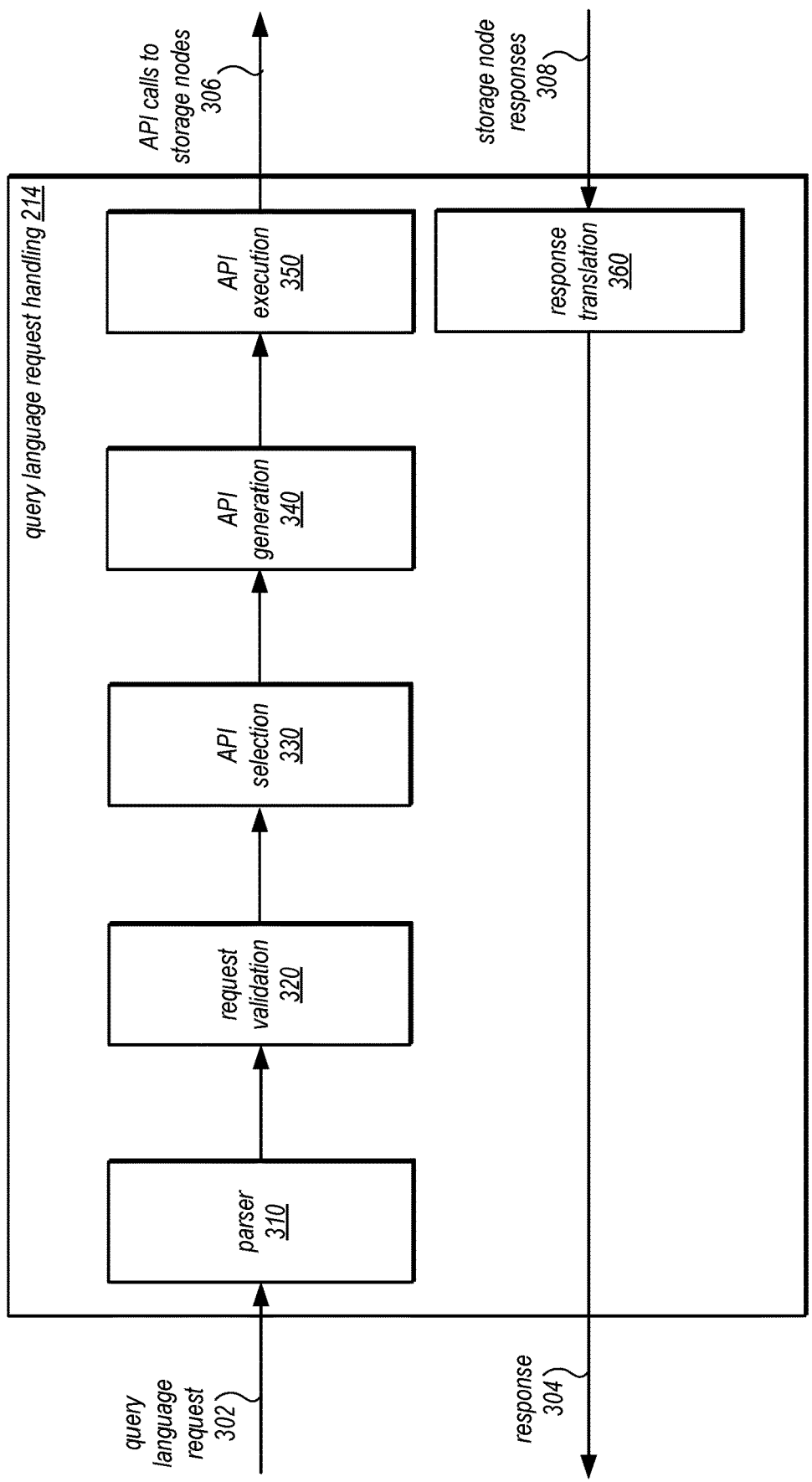
FIG. 3 is a logical block diagram illustrating query language request handling for a non-relational database, according to some embodiments.

FIG. 3 is a logical block diagram illustrating query language request handling for a non-relational database, according to some embodiments. Query request handling 214 may implement parser 310 to parse a received query language request 302. For example, parser 310 may identify or recognize keywords, parameters, or other delimiters for the query language. In some embodiments, parser 310 may be invoked or implemented as a library for the query language that may be received, such as SQL parsing library or other query language such as PartiQL (which may extend and/or be compatible with the SQL) which may provide the information to parse query language request 302. Parser 310 may generate a symbol tree and/or parse graph which may be provided to request validation.

Request validation 320 may examine the specified commands, parameters, and operators to determine whether the request 302 is valid. For example, specified commands may be compared with a white list of supported commands. In some embodiments, request validation 320 may examine parameters for validity. For example, the data types of specified parameters may be evaluated for supported data types in the non-relational database service. Request validation 320 may also validate the content of some parameters, such as whether or not a specified table or data set exists. Invalid requests may be rejected with a response that indicates the command is not supported (not illustrated).

API selection 330 may receive the command(s) and valid parameter(s) for selecting an API. API selection 330 may implement various ones of the techniques discussed below with regard to FIGS. 8 and 9. For example, API selection may maintain a mapping or other classification scheme for commands. Each command classification may include one or more possible APIs which may be invoked to provide a result consistent with the command. For instance classifications may be divided into data definition language (DDL) requests and data manipulation language (DML). These classifications may be further broken down into requests (e.g., DDL into create table or drop table and DML into select, update, insert, and delete). Each command may be further broken down into groups of possible requests. For example, select may be mapped to possible get, query, and scan APIs. In some embodiments, the performance costs of each API in a classification may be ranked or compared so that API selection 330 may make an optimal selection of the most performant API. Such a selection may be conditioned on whether the appropriate parameters for the different types of requests are specified in the query language request.

In some embodiments, different copies of a database, such as a secondary index, view, or other copy of data may be used, and thus API(s) may be selected to be directed to those alternative copies, which may provide more performant access to the requested data in some scenarios. For example, a secondary index may be a subset or selection of data from one or more base tables in the non-relational database that is organized or indexed differently (e.g., by a different primary key), which may improve the performance for certain data when performing, for example, a select).

API generation 340 may generate the selected API(s) to perform query language request 302. For example, API generation 340 may construct or specify a message, instruction, or other request to make the appropriate API calls. In some embodiments, API generation 340 may convert or change data types of parameters from query language specified data types to a corresponding data type supported by non-relational database service 210. For example, a "blob" data type in the query language request may be changed to a "binary" data type. In some instances, changing the data type may include reformatting (as opposed to just changing the data type designation) the data (e.g., removing trailing zeros, representing NULL differently, etc.). In some embodiments, an intermediate format or other representation of data in an originally specified data type may be used to determine which data type to use in the translated API. For example, a "Date" data type may be stored in a binary format, literal (e.g., character literals) format, or other representation in order to apply one or more translation rules to detect the characteristics of a "Date" and select a "String" translation data type. Some changes of data type may result in data loss and thus could trigger a failure or validation error similar to request validation 320, resulting in the request not being performed, in some embodiments. API execution 350 may then send the generated API calls to the appropriate storage nodes 306.

Query language request handling 214 may also implement response translation 360. Response translation may receive various storage node response(s) 308 for the API(s) of query language request 302. In those scenarios where the response is expected in a particular format, response translation 360 may perform the data format change (e.g., from a JSON format to an ION format). In some embodiments, data type conversions may be reversed to return data types specified differently for the API calls to be reverted back in a result or response to the expected data type.

Figure 4:
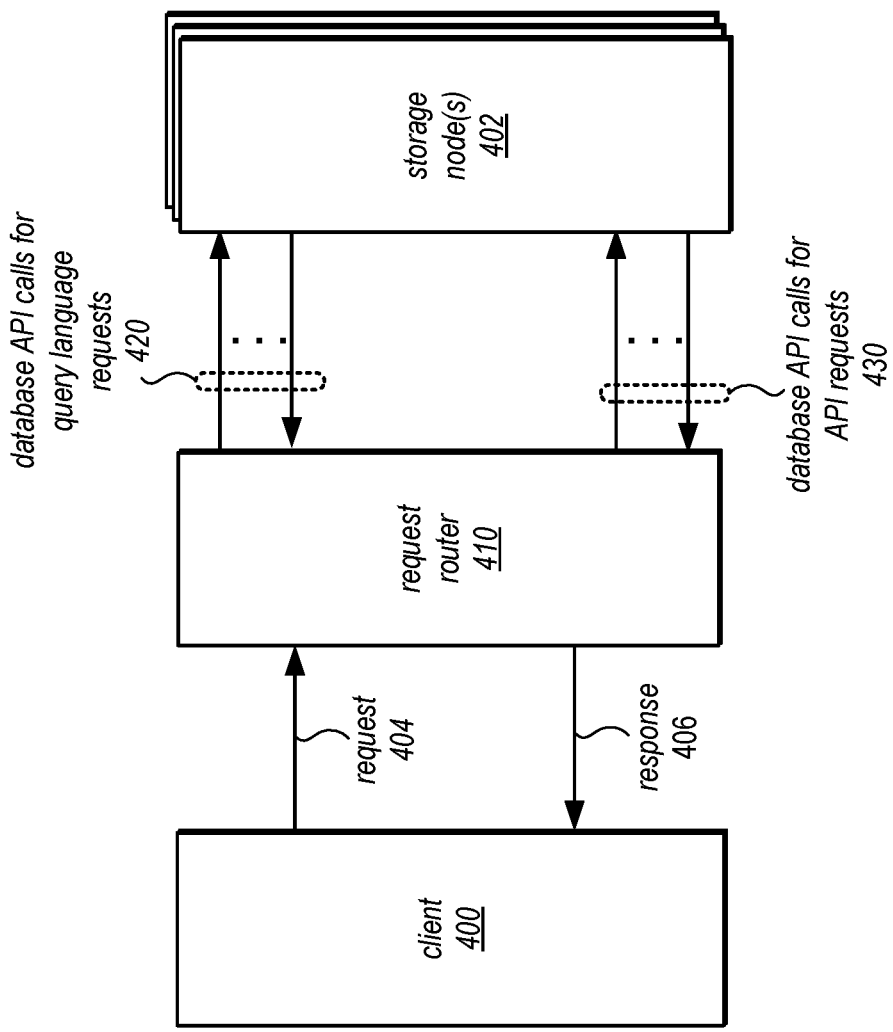
FIG. 4 is a logical block diagram illustrating a request router that directly handles query language and API requests, according to some embodiments.

As noted above with regard to FIG. 2, different components of a non-relational database service may perform techniques for invoking supported non-relational database operations to provide results consistent with commands specified in a relational query language. The following discussion of FIGS. 4-7 illustrates various example architectures for handling query language requests. FIG. 4 is a logical block diagram illustrating a request router that directly handles query language and API requests, according to some embodiments.

Client 400 may be a client similar to client 270 in FIG. 2 or client 180 in FIG. 1, in some embodiments. A request routing node, such as request router 410, which may be similar to request routing node(s) 250 in FIG. 2) may implement request handling from the perspective of client 400 (e.g., so that client 400 does not have to coordinate which location to send a request). For example, client 400 may send a request 404 to access the non-relational database to request router 410. Request router 410 may recognize the request as a query language request when unpacking, decrypting, and/or otherwise accepting the request. Request router 410 may then determine what APIs to invoke and send 420 the appropriate requests to storage node(s) 402 (which may be similar to storage nodes 240 in FIG. 2) that store data for the targeted non-relational database in the query language request. Request router 410 may then generate and send a result as response 406 to client 500. Similarly, for API requests, request router 410 may recognize and perform the appropriate API requests 430 and return response 406.

Figure 5:
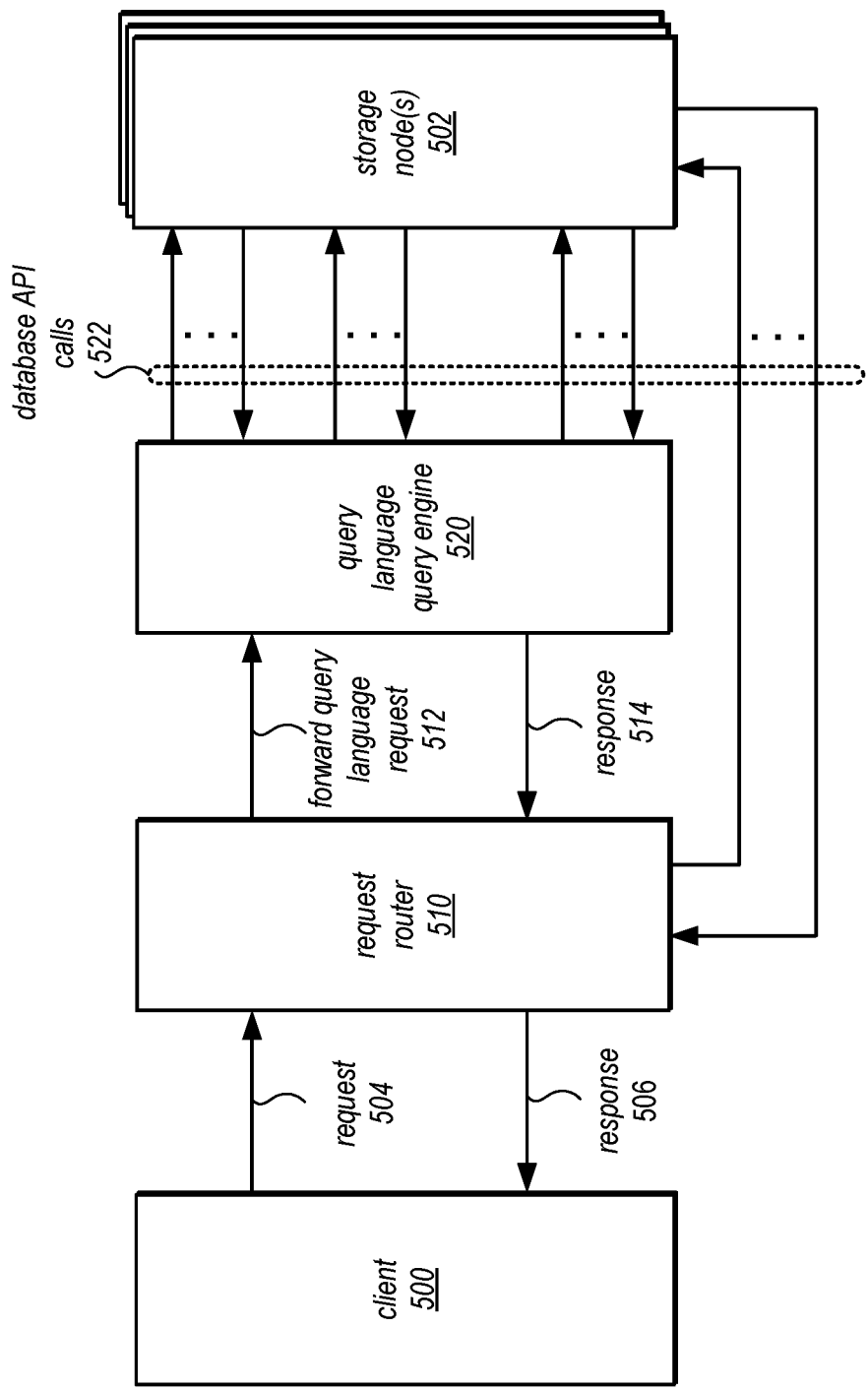
FIG. 5 is a logical block diagram illustrating a request router that forwards requests to a query language query engine to handle the query language requests, according to some embodiments.

FIG. 5 is a logical block diagram illustrating a request router that forwards requests to a query language query engine to handle the query language requests, according to some embodiments. Client 500 may be a client similar to client 270 in FIG. 2 or client 180 in FIG. 1, in some embodiments. A request routing node, such as request router 510, which may be similar to request routing node(s) 250 in FIG. 2) may implement request handling from the perspective of client 500 (e.g., so that client 500 does not have to coordinate which location to send a request). For example, client 500 may send a request 504 to access the non-relational database to request router 510. Request router 510 may recognize the request as a query language request when unpacking, decrypting, and/or otherwise accepting the request. Request router 510 may then forward the query language request 512 to query language query engine 520. Query language query engine 520 may be similar to query language query engines 240 in FIG. 2. Query language query engine 520 may then determine what APIs to invoke and send 522 the appropriate requests to storage node(s) 502 (which may be similar to storage nodes 240 in FIG. 2) that store data for the targeted non-relational database in the request. Query language query engine 520 may then generate and send a result as response 514 to request router 510, which in turn may which may be returned as response 506 to client 500. For API requests, request router 510 may perform the appropriate API requests 522 and return response 506.

Figure 6:
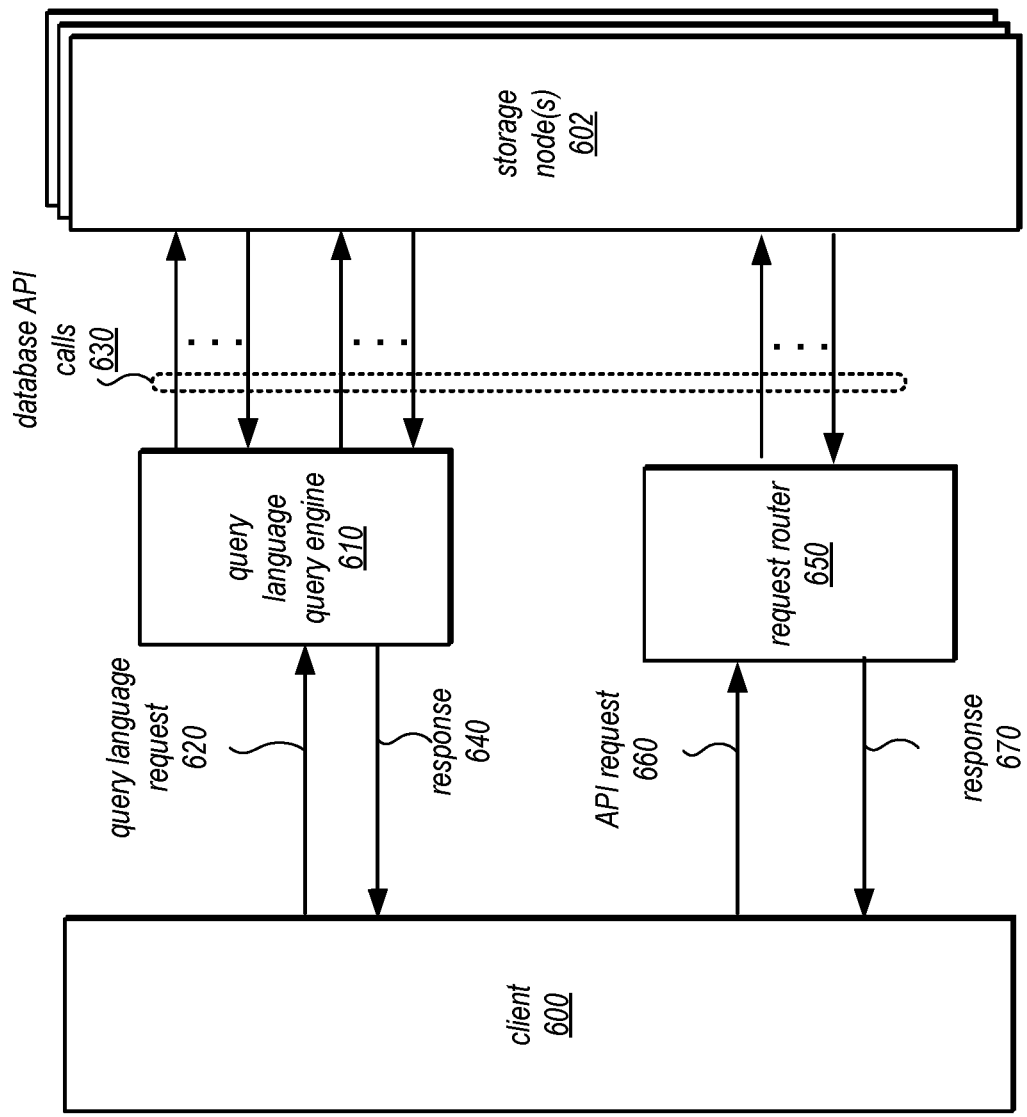
FIG. 6 is a logical block diagram illustrating a query language query engine and request router that directly handle query language and API requests, according to some embodiments.

FIG. 6 is a logical block diagram illustrating a query language query engine and request router that directly handle query language and API requests, according to some embodiments. Client 600 may be a client similar to client 270 in FIG. 2 or client 180 in FIG. 1, in some embodiments. Different network endpoints may be implemented in non-relational database service 210, in some embodiments. One network endpoint may be implemented for query language requests, in some embodiments. For example, client 600 may send a query language request 620 to the endpoint, which may be routed to query language query engine 610. Query language query engine 610 may be similar to query language query engines 240 in FIG. 2. Query language query engine 610 may then determine what APIs to invoke and send 730 the appropriate requests to storage node(s) 602 (which may be similar to storage nodes 240 in FIG. 2) that store data for the targeted non-relational database in the request. Query language query engine 610 may then generate and send a result as response 640 which may be returned to client 600.

In some embodiments, a different network endpoint may be maintained for API requests to access a non-relational database. For example, client 600 send 660 the request to request router 650 (e.g., similar to request routing nodes 250 in FIG. 2). Request router 650 may then direct the API request 630 to the appropriate storage node(s) 602 for the request. Request router 750 may then generate and send a result as response 670 which may be returned to load balancer 710, which in turn may send a response 670 to client 600.

Figure 7:
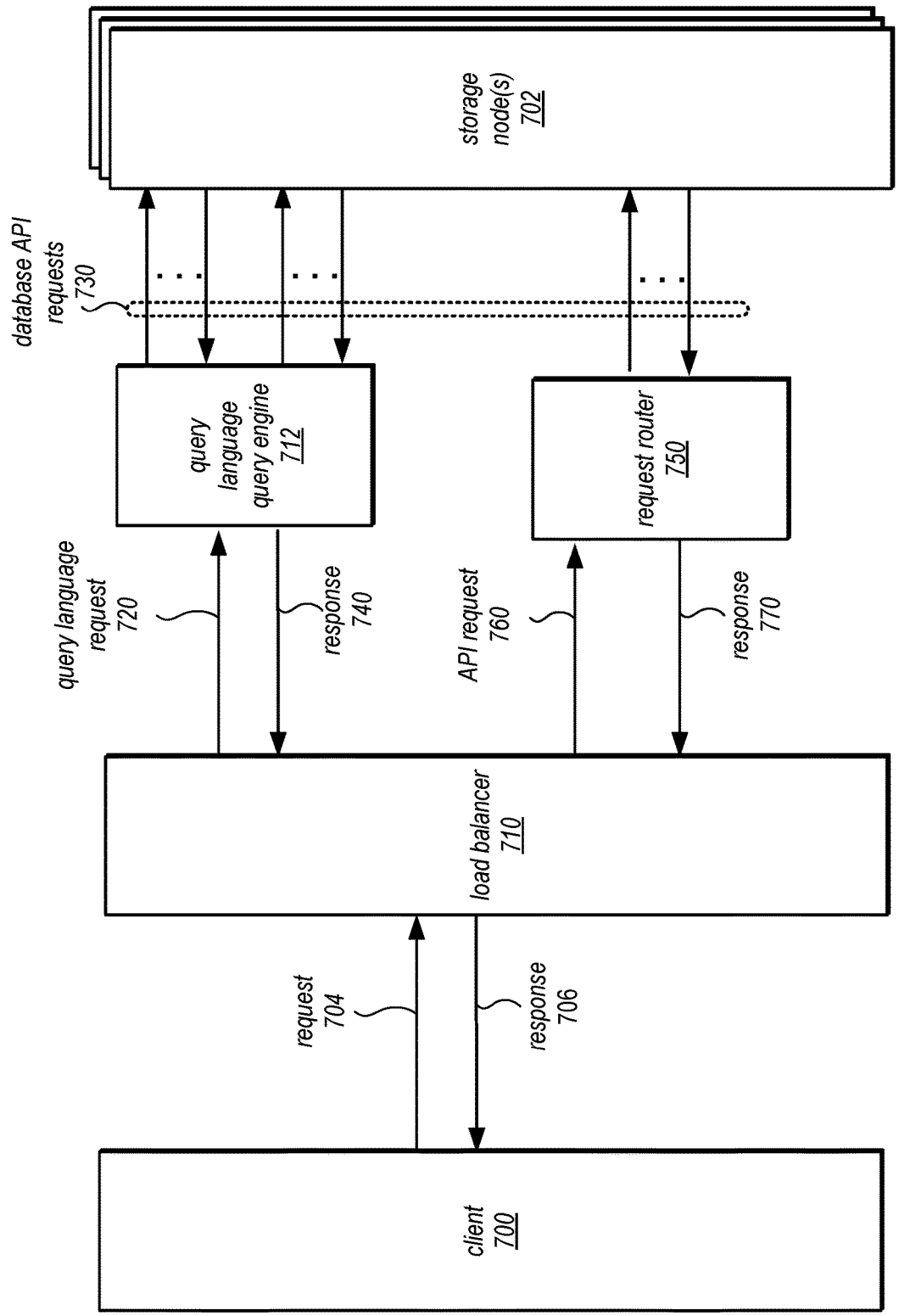
FIG. 7 is a logical block diagram illustrating a load balancer that directs different requests to different non-relational database components that handle query language and API requests, according to some embodiments.

FIG. 7 is a logical block diagram illustrating a load balancer that directs different requests to different non-relational database components that handle query language and API requests, according to some embodiments. Client 700 may be a client similar to client 270 in FIG. 2 or client 180 in FIG. 1, in some embodiments. Load balancer 710 may be a load balancer similar to load balancer(s) 720 in FIG. 2. When a client sends a request 704 to access data in a non-relational database, load balancer 710 may examine a packet to determine whether the request is for a query language specified request or an API. For example, the operation name or type may be passed in a TCP packet header or other header field. In some embodiments, load balancer 710 may access the payload of a packet (including decrypting the packet contents to determine the type of request) before re-encrypting and sending the request.

For a query language request, load balancer 710 may send the query language request 720 to a query language query engine 712. Query language query engine 712 may be similar to query language query engines 240 in FIG. 2. Query language query engine 712 may then determine what APIs to invoke and send 730 the appropriate requests to storage node(s) 702 (which may be similar to storage nodes 240 in FIG. 2) that store data for the targeted non-relational database in the request. Query language query engine 712 may then generate and send a result as response 740 which may be returned to load balancer 710, which in turn may send a response 706 to client 700.

For an API request, load balancer 710 may send 760 the request to request router 740 (e.g., similar to request routing nodes 250 in FIG. 2). Request router 750 may then direct the API request 730 to the appropriate storage node(s) 702 for the request. Request router 750 may then generate and send a result as response 770 which may be returned to load balancer 710, which in turn may send a response 706 to client 700.

Figure 8:
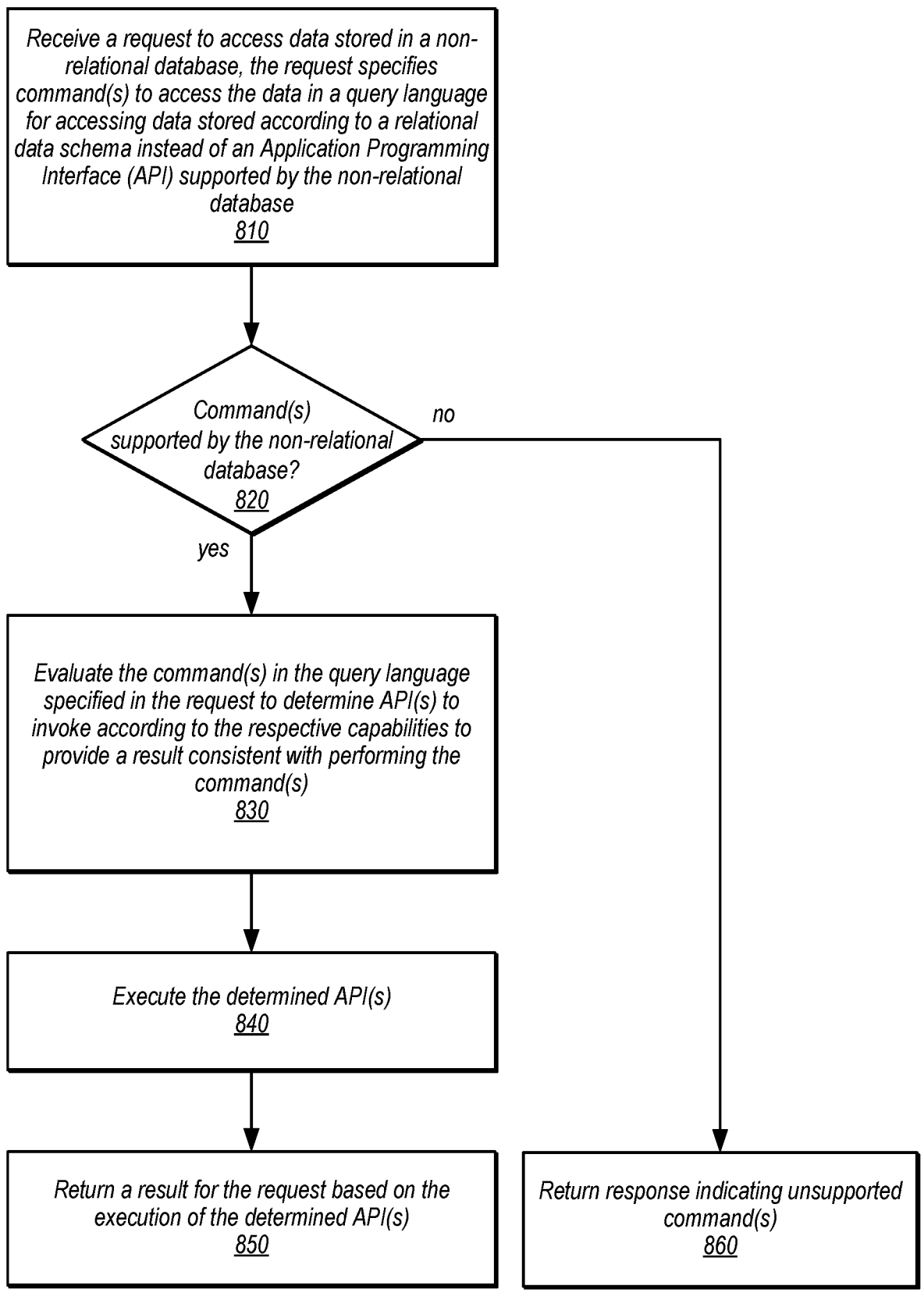
FIG. 8 is a high-level flowchart illustrating various methods and techniques to coordinate the performance of a transaction across storage nodes that order transaction requests, according to some embodiments.

The examples of a database service that implements as discussed in FIGS. 2-7 above have been given in regard to a non-relational database service (e.g., a NoSQL database service, document database, a key-value store, etc.). However, various other types of may implement invoking supported non-relational database operations to provide results consistent with commands specified in a relational query language, in other embodiments. FIG. 8 is a high-level flowchart illustrating various methods and techniques to implement invoking supported non-relational database operations to provide results consistent with commands specified in a relational query language, according to some embodiments. These techniques, as well as the techniques discussed with regard to FIGS. 8-9, may be implemented using components or systems as described above with regard to FIGS. 2-7, as well as other types of databases, query engines, or systems, and thus the following discussion is not intended to be limiting as to the other types of systems that may implement the described techniques.

As indicated at 810, a request to access data store in a non-relational database may be received, in various embodiments. The request may be received via a network interface for the non-relational database service. In some embodiments, the request may be formatted according to a protocol specified by a driver or connection component implemented at a client application that can format and send the request to the non-relational database service. In some embodiments, the request may be formatted according to an API for submitting requests in the query language (e.g., "ExecuteQueryLanguageStatement"). As discussed above with regard to FIG. 1, the non-relational database may support performing different access operations (e.g., get data, put data, update data, delete data, scan for data, query for data, etc.) which may be invoked by different respective APIs. The request to access the data may be specified by the query language instead of one of the access operations invoked by the APIs, in some embodiments.

The request may be formatted in a query language for accessing data according to a relational data schema, in some embodiments. For example, SQL or other query languages that presume a structure, such as a pre-defined data schema for the data stored in the database (e.g., a number of columns with specified data types). In some embodiments, the query language may also support operations over data that is not structured, and thus stored without being stored in a pre-defined data format. For example, a query language may be SQL-compatible but also accept as parameters or inputs for operations over semi-structured data, nested data, and schema-less data, in addition to data stored a relational data format.

As indicated at 820, a determination may be made as to whether the command(s) in the request are supported by the non-relational database, in some embodiments. For example, a parsing of the request may identify or separate commands from parameters. The commands may then be compared with a mapping or listing of supported commands. If a command is not found, then a command may not be supported. In some embodiments, a command may be supported by the parameters specified for the command may not be supported (e.g., As indicated by the negative exit from 820, if a command is not found, then a response may be returned indicating the unsupported command(s).

For supported commands, the command(s) may be evaluated in the query language specified in the request to determine API(s) to invoke according to the respective capabilities to provide a result consistent with performing the command(s), in some embodiments, as indicated at 830. For example, mappings between different query language commands and API commands that provide similar functionality (as discussed above with regard to FIG. 3) may be maintained. Each mapping may identify, for instance, commands that add new data (e.g., individually or as a batch), commands that update data, commands that read or locate data, or commands that delete or remove data.

As indicated at 840, the determined API(s) may be executed, in some embodiments. For example, parameters for the API(s) may be recognized or determined from the request (e.g., identifiers for target objects, such as tables, values for predicates or other conditions, values for manipulating or adding data, etc.). Instructions, workflows, or other invocations of the API(s) may be generated with the determined parameters and provided to the non-relational database component executing the API(s). As indicated at 840, a result for the request based on the execution of the determined API(s) may be returned, in some embodiments. For example, the API(s) may be executed resulting in one or multiple portions of data, which may then be combined and returned as a result. In some embodiments, as discussed above with regard to FIG. 3, the data type (or other formatting of the response) of one or more result values may be changed to match the expected result value as specified in the request. If, for instance, the query language supports a string formatted and/or designated in one way (and the non-relational database supports a string formatted and/or designated in a different way), then the response may convert a string in a response back into the data type supported by the query language. Similar conversions may be performed when receiving a request.

As discussed above with regard to FIGS. 4-7, different arrangements of non-relational database components may responsible for evaluating, executing, and returning results of a request. For instance, a request router, load balancer, dedicated query language query engine, and/or storage node may perform various features or combinations of features discussed above.

Figure 9:
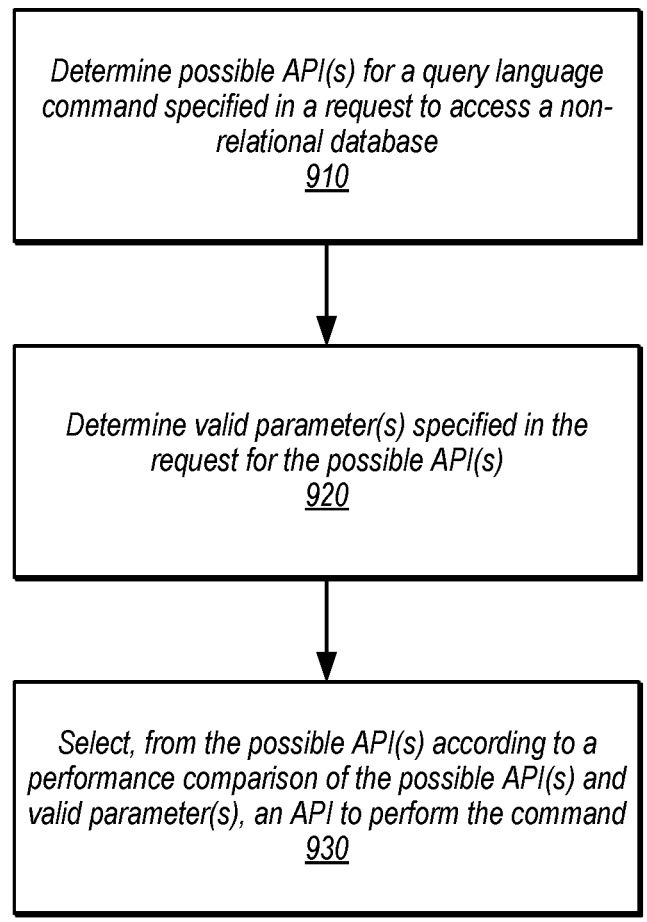
FIG. 9 is a high-level flowchart illustrating various methods and techniques to translate a request with commands specified in a query language for access data according to a relational data schema to Application Programming Interfaces (APIs) supported by a non-relational database, according to some embodiments.

FIG. 9 is a high-level flowchart illustrating various methods and techniques to translate a request with commands specified in a query language for access data according to a relational data schema to Application Programming Interfaces (APIs) supported by a non-relational database, according to some embodiments. As indicated at 910, possible API(s) for a query language specified in a request to access a non-relational database may be determined, in some embodiments. For example, each command may be classified as a type of command or request that is evaluated according to a different decision tree (or branch of a decision tree) which may identify the possible API(s) for that command.

As indicated at 920, valid parameter(s) specified in the request for the possible API(s) may be determined, in some embodiments. For example, each possible API may have defined an allowed parameter listing for invoking the API. Some parameters specified in the request may be invalid for one API but not another. For instance, parameters A and B may be specified in the request. One API may support parameter A, whereas a second possible API may support both parameters A and B. As indicated at 930, a selection from the possible API(s) may be made according to a performance comparison of the possible API(s) and valid parameters for in order to select an API to perform the command, in some embodiments. If, for instance, multiple possible API(s) can accept the specified parameter(s) and return a consistent result, then the performance characteristics of the different APIs may be ranked or otherwise and compared, with the more performant (e.g., faster, lower resource utilization cost, etc.) being selected. In this way, the translation of a query language command may be optimized for performance in addition to capability.

The methods described herein may in various embodiments be implemented by any combination of hardware and software. For example, in one embodiment, the methods may be implemented by a computer system (e.g., a computer system as in FIG. 10) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 10:
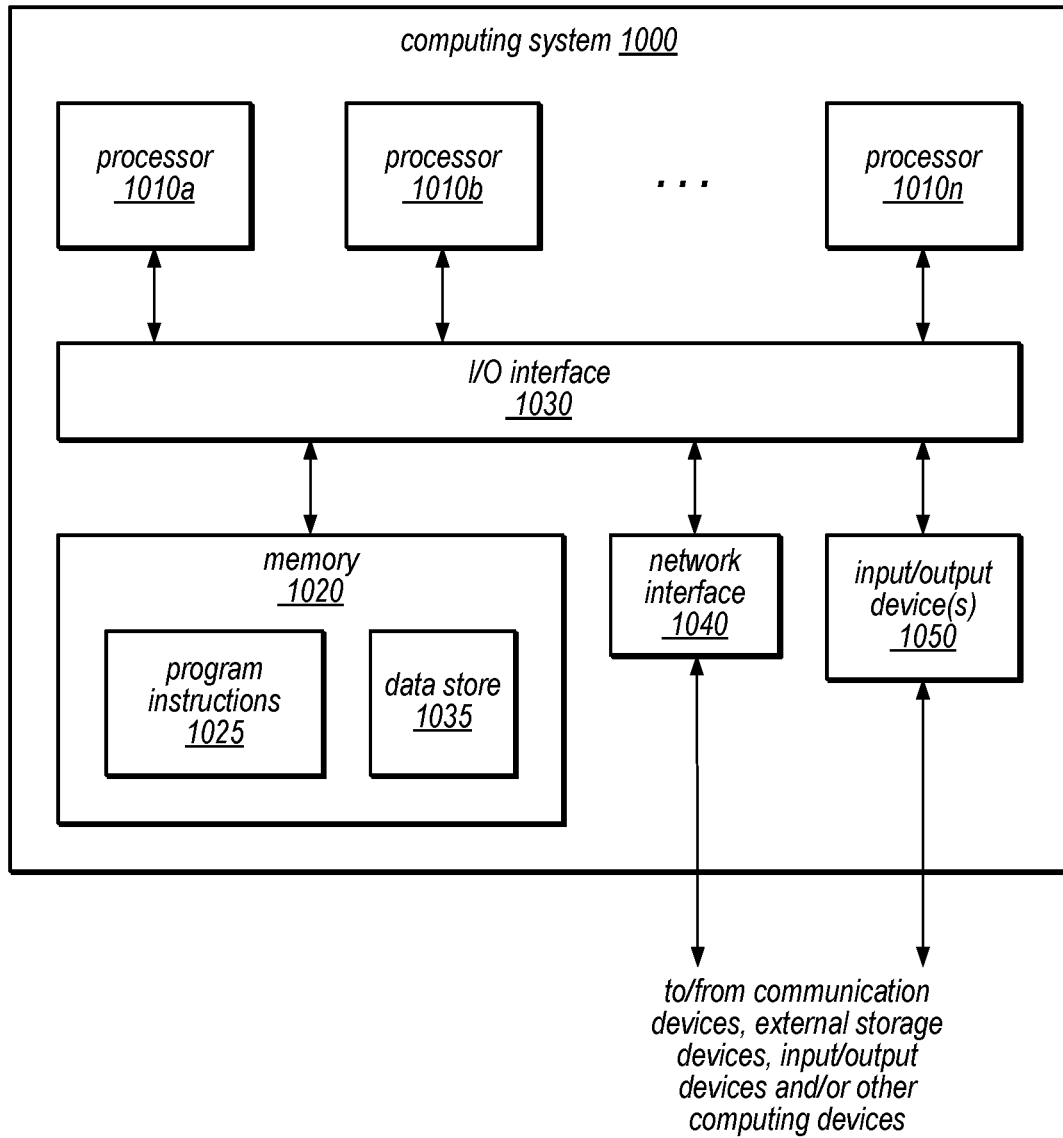
FIG. 10 is a block diagram illustrating an example computing system, according to some embodiments.

Embodiments to implement invoking supported non-relational database operations to provide results consistent with commands specified in a relational query language as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing node or compute node, computing device, compute device, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, that implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor; and
   a memory, storing program instructions that when executed by the at least one processor, cause the at least one processor to implement a non-relational database, the non-relational database configured to:
   receive, via a network interface for the non-relational database, a request to access data stored in the non-relational database, wherein the non-relational database supports a plurality of application programming interfaces (APIs) invoked to perform different respective operations to access the non-relational database, wherein the request specifies one or more commands to access the data in a query language for accessing data stored according to a relational data schema instead of one of the APIs;
   parse the request to identify the one or more commands in the query language specified in the request;
   identify respective classifications out of a plurality of command classifications for the one or more commands;
   compare the one or more commands with respective mappings between the one or more commands and one or more possible APIs of the plurality of APIs corresponding to the respective classifications to identify one or more of the APIs to invoke, wherein the identification evaluates respective capabilities of the different operations to provide a result consistent with performing the one or more commands;
   execute the identified one or more APIs; and
   return the result for the request based on executing the determined one or more APIs.

2. The system of claim 1, wherein the identification of the one or more of the APIs to invoke the non-relational database further determines that the one or more commands in the query language are supported by the non-relational database.

3. The system of claim 1,
   receive, by a request router that handles requests that invoke the APIs, one or more requests to access the non-relational database that invoke one or more of the APIs;
   wherein the receiving, the parsing, the identifying, the comparing, the executing, and the returning are performed by a query engine for the non-relational database that handles requests specified in the query language;
   receive, by a load balancer, the request to access the data stored in the non-relational database;
   determine, by the load balancer, based on information in the data request, whether the request is specified according to the query language; and
   in response to the determination that the request is specified according to the query language, forward, by the load balancer, the request to the query engine.

4. The system of claim 1, wherein the non-relational database is implemented as part of a non-relational database service offered by a provider network and wherein to execute the identified one or more APIs the non-relational database is configured to cause one or more storage nodes to perform the corresponding operations for the one or more APIs.

5. The system of claim 4, wherein to return the result for the request the non-relational database is configured to change at least a portion of the result from a first data type to a second data type determined according to the one or more commands to access the data specified in the query language.

6. A method, comprising:
   receiving a request to access data stored in a non-relational database that supports a plurality of different operations to access the non-relational database invoked via different respective application programming interfaces (APIs), wherein the request specifies one or more commands to access the data in a query language for accessing data stored according to a relational data schema instead of one of the APIs;
   identifying respective classifications out of a plurality of command classifications for the one or more commands;
   comparing the one or more commands in the query language specified in the request with respective mappings between the one or more commands and one or more possible APIs of the different respective APIs corresponding to the respective classifications to determine one or more of the APIs to invoke, wherein the determination evaluates respective capabilities of the different operations to provide a result consistent with performing the one or more commands;
   returning the result for the request based on executing the determined one or more APIs.

7. The method of claim 6, further comprising:
changing from a first data type for a parameter specified in the request to a second data type; and
executing the determined one or more APIs using the parameter in the second data type.

8. The method of claim 7, wherein changing from the first data type for the parameter specified in the request to the second data type comprises evaluating a representation of data in the first data type to identify the second data type.

9. The method of claim 6, further comprising:
receiving, via the network interface for the non-relational database, another request to access data stored in the non-relational database, wherein the other request specifies another command to access the data in the query language;
identifying one of the APIs to perform the other command;
determining that a parameter for the other command in the query language specified in the request is not supported by the identified one API; and
returning a response to the other request to indicating that the parameter for the other command is not supported.

10. The method of claim 6, wherein comparing the one or more commands in the query language specified in the request with respective mappings between the one or more commands and the one or more possible APIs of the different respective APIs corresponding to the respective classifications to determine one or more of the APIs to invoke comprises selecting from the one or more possible APIs to perform one of the commands based on one or more parameters specified in the request.

11. The method of claim 6, wherein returning the result for the request comprises changing at least a portion of the result from a first data type to a second data type determined according to the one or more commands to access the data specified in the query language.

12. The method of claim 6, further comprising:
receiving, by a request router that handles requests that invoke the APIs, one or more requests to access the non-relational database that invoke one or more of the APIs; and
wherein the receiving, the identifying, the comparing, and the returning are performed by a query engine for the non-relational database that handles requests specified in the query language.

13. The method of claim 12, further comprising:
receiving, by a load balancer, the request to access the data stored in the non-relational database;
determining, by the load balancer, based on information in the data request, whether the request is specified according to the query language; and
in response to determining that the request is specified according to the query language, forwarding, by the load balancer, the request to query engine.

14. A non-transitory, computer-readable storage medium, storing program instructions that when executed by one or more computing devices cause the one or more computing devices to implement:
receiving, via a network interface for a non-relational database, a request to access data stored in the non-relational database, wherein the non-relational database supports a plurality of application programming interfaces (APIs) invoked to perform different respective operations to access the non-relational database, wherein the request specifies one or more commands to access the data in a query language for accessing data stored according to a relational data schema instead of one of the APIs;
evaluating the request to identify the one or more commands in the query language specified in the request;
identifying respective classifications out of a plurality of command classifications for the one or more commands;
comparing the one or more commands with respective mappings between the one or more commands and one or more possible APIs of the different respective APIs corresponding to the respective classifications to select one or more of the APIs to invoke, wherein the selection evaluates respective capabilities of the different operations to provide a result consistent with performing the one or more commands;
executing the selected one or more APIs; and
returning the result for the request based on the executing of the determined one or more APIs.

15. The one or more non-transitory, computer-readable storage media of claim 14, wherein the one or more non-transitory, computer-readable storage media store further program instructions that when executed on or across the one or more other computing devices, cause the one or more computing devices to further implement:
receiving, via the network interface for the non-relational database, a request to create a table in the non-relational database that is specified in the query language; and
in response to receiving the request to create the table:
identifying one of the APIs that performs an operation to create a collection of items in the non-relational database; and
executing the one API to create the new collection of items according to one or more parameters for the table specified in the request to create the table.

16. The one or more non-transitory, computer-readable storage media of claim of claim 14, wherein the selection of the one or more of the APIs to invoke further determines that one or more parameters specified in the query language are valid for executing at least one of the one or more APIs.

17. The one or more non-transitory, computer-readable storage media of claim of claim 14, wherein the one or more non-transitory, computer-readable storage media store further program instructions that when executed on or across the one or more other computing devices, cause the one or more computing devices to further implement:
receiving, via the network interface for the non-relational database, another request to access data stored in the non-relational database, wherein the other request specifies another command to access the data in the query language;
evaluating the request to determine that the other command in the query language specified in the request is not supported by the non-relational database; and
returning a response to the other request to indicating that the other command is not supported.

18. The one or more non-transitory, computer-readable storage media of claim of claim 14, wherein the one or more non-transitory, computer-readable storage media store further program instructions that when executed on or across the one or more other computing devices, cause the one or more computing devices to further implement:
wherein said receiving the request to access the data in the non-relational data service is performed by a request router that forwards the request to a query engine for performing requests specified in the query language;

wherein said evaluating the request to identify the one or more commands in the query language specified in the request, wherein said identifying the respective classifications of the one or more commands, wherein said comparing the one or more commands with respective mappings between the one or more commands and the plurality of APIs to select the one or more of the APIs to invoke and said executing the determined one or more APIs are performed by the query engine;

receiving, by the query engine, a response from one or more storage nodes that the query engine instructed to perform the operation corresponding to at least one of the one or more API calls;

generating, by the query engine, a result for the request based, at least in part, on the response received from the storage node; and forwarding, by the query engine, the result for the request to the request router, wherein the request router performs the returning the result for the request.

19. The one or more non-transitory, computer-readable storage media of claim of claim 14, wherein the request to access the data in the non-relational database is received at a network load balancer and wherein the one or more non-transitory, computer-readable storage media store further program instructions that when executed on or across the one or more other computing devices, cause the one or more computing devices to further implement:

- determining, by the load balancer, based on information in the request, whether the request is specified in the query language or one of the APIs; and
- in response to determining that the request is specified in the query language, forwarding, by the load balancer, the request to a query engine, wherein the query engine performs the evaluating, the comparing, the executing, and the returning.

20. The one or more non-transitory, computer-readable storage media of claim of claim 14, wherein the non-relational database is hosted as part of a non-relational database service offered by a provider network, wherein executing the determined one or more APIs comprises sending a request to perform at least one of the determined one or more APIs to a storage node for the non-relational database, wherein the storage node accesses the data in the non-relational database as part of performing the at least one API.

* * * * *